3,000,852
N-(ALKYL)-N'-(p-ALKYL PHENYL)-p-PHENYLENE-
DIAMINES AS STABILIZERS FOR RUBBERS
Paul L. Merz, Naugatuck, Conn., assignor to United
States Rubber Company, New York, N.Y., a corporation of New Jersey
No Drawing. Filed Nov. 12, 1957, Ser. No. 695,517
14 Claims. (Cl. 260—45.9)

This invention relates to new chemical compounds, the N-alkyl-N'-(p-alkyl phenyl)-p-phenylenediamines, and to their use as protectants for easily oxidizable organic substances which are unsaturated, such as edible fats and oils, gasoline, etc., and especially for protecting vulcanized rubber from deterioration.

It is known that conventional rubber vulcanizates suffer from three serious types of degradation: (a) bulk oxidation; (b) surface oxidation; and (c) ozone cracking.

Bulk oxidation is characterized by a slow decrease in tensile strength of the vulcanizate and a change in the ultimate elongation and in the modulus of elasticity without any apparent surface change. It is conveniently measured by observing changes in these bulk properties following accelerated aging in air or oxygen at elevated temperatures. Surface oxidation is the rapid light-catalyzed oxidation of the vulcanizate to yield a hard, inelastic, but flexible, surface with shallow grooves. The bulk properties (tensile, modulus, etc.) are unaffected.

Both the bulk and surface oxidation of rubber vulcanizates can be inhibited by commercial antioxidants. These commercial antioxidants are of two types; the phenolic antioxidants typified by the alkylated cresols such as 2,6-di-tertiary butyl-p-cresol and 2,2'-methylenebis (4-methyl-6-tertiary butyl-phenol) and the amine antioxidants typified by N-phenyl-B-naphthylamine, and by the reaction products of diphenylamine with acetone.

The third type of degradation, ozone cracking, is also a surface phenomenon; however, it is not an oxidative but rather an ozonolysis phenomenon. Although there are only a few parts of ozone present per hundred million parts of air, this small amount of ozone is sufficient to cause the formation of deep cracks in stressed rubber vulcanizates exposed to the atmosphere. Unfortunately, most commercially available antioxidants offer little or no protection against ozone cracking. Accordingly, a principal object of the present invention is to provide a rubber vulcanizate that is more effectively protected against ozone cracking as well.

The invention is based on the discovery that N-alkyl-N'-(p-alkyl phenyl)-p-phenylenediamines represented by the formula

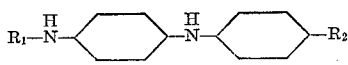

impart a very high degree of protection to rubber vulcanizates against ozone cracking as well as bulk oxidation. Two distinct classes of compounds are comprehended. One class relates to where $R_2$ is a straight or branched-chain alkyl hydrocarbon in which the carbon atom attached to the phenyl nucleus is primary or secondary, i.e., the alpha-carbon of the group $R_2$ being directly linked to at least one hydrogen atom. Representative of this is where $R_2$ is methyl, ethyl, isopropyl, dodecyl, etc. The other or second class relates to where $R_2$ is a tertiary alkyl group only, the alkyl group containing at least four carbon atoms; representative of this is tertiary butyl, tertiary octyl, tertiary dodecyl, etc.

$R_1$ for both classes is a straight or branched-chain aliphatic hydrocarbon containing from 3 to 9 carbon atoms. Representative of $R_1$ is isopropyl, sec.-butyl, n-octyl, isobutyl, 1,3-dimethyl butyl, di(isobutyl)methyl, etc.

The structures in both classes are devoid of negative substituents, such as hydroxyl, cyano, carbethoxy or aryl, since their presence tends to reduce the efficiency of the chemicals as retarders of oxidation or ozone cracking.

Both classes will be dealt with separately below since they have distinctive attributes per se, and when compared with known commercial antioxidants.

The antiozonant chemicals of the first class may be prepared by the reductive alkylation of 4-amine, 4-nitro- or 4 nitroso-4'-alkyl diphenylamines with an aliphatic ketone or aldehyde in the presence of a suitable hydrogenation catalyst such as nickel, copper chromite, palladium or platinum.

The antiozonant chemicals of the second class may be prepared by the Friedel-Crafts alkylation of the known N-alkyl-N'-phenyl-p-phenylenediamines (U.S. Patent No. 2,734,808, dated February 14, 1956, to Charles B. Biswell) by an alkene in which at least one carbon atom of the double bond is disubstituted. Examples of available olefins filling the requirements are isobutylene, diisobutylene, tetrapropylene, etc.

The rubber stock to which the antiozonant composition of the invention is added may be any sulfur-vulcanizable rubber which is ordinarily subject to attack by ozone, whether natural (Hevea) rubber, or a synthetic rubber, such as the rubbery homopolymers or copolymers of butadiene and similar aliphatic conjugated diolefin hydrocarbons, such as butadiene-styrene copolymer rubber, butadiene-acrylonitrile copolymer rubber, butadiene-vinyl-pyridine copolymer rubber, isobutylene-isoprene copolymer rubber, and the like. Natural rubber and synthetic rubbers of the foregoing type may be designated by the general term diolefin polymer rubbers. Generally, I employ from about 1/10 to 5 parts, by weight, of the antiozonant, per 100 parts of diolefin polymer rubber.

The rubber stock may be compounded with any desired conventional vulcanizing agents, accelerators, softeners, fillers, etc. The compounded rubber stock containing the present antiozonant combination may be shaped and vulcanized in any desired manner in accordance with conventional practice. Standard test methods reveal in a striking manner the remarkable improvement in ozone and oxidation resistance imparted to the vulcanizate by the present chemicals, especially under dynamic conditions.

The following examples illustrate the invention of making and using compounds of the first class.

EXAMPLE 1

One mole of p-nitrochlorobenzene, 2 moles of p-toluidine, 0.7 mole of potassium carbonate, 0.66 mole of dimethyl formamide, and 0.01 mole of cuprous iodide were charged into a 1-liter, 3-neck flask equipped with a motor-driven stirrer, thermometer, Dean-Stark trap and reflux condenser. The reaction mixture was boiled for 6 hours at 188° C.–190° C., during which time ½ mole of water collected in the Dean-Stark trap.

The reaction product was filtered and the filtrate blown with steam to remove all unchanged toluidine and p-nitrochlorobenzene. The impure but crystalline 4-nitro-4'-methyl diphenylamine residue was recrystallized once from hot methanol. Yield, 75% of theory; M.P. 135° C.–138° C.

One-half mole of the above 4-nitro-4'-methyl diphenylamine was charged into a hydrogenation autoclave together with 2 moles of acetone and 6 grams of copper chromite catalyst (prepared according to von Brauer, U.S. Patent No. 2,323,984). The charge was hydrogenated at 155° C. and 1300 to 500 p.s.i. of hydrogen for 5 hours. After cooling and venting the light red reaction mixture was removed and filtered to separate the catalyst. The filtrate was vacuum distilled. Ninety-eight (98) grams (i.e., 82% of theory) of N-isopropyl-N'-(p-methyl phenyl)-p-phenylenediamine; B.P. 155° C.–164° C./0.2 mm. was obtained. Melting point, after one recrystallization from methanol, was 89° C.

Percent nitrogen: calculated for $C_{16}H_{20}N_2$, 11.65%; found, 11.6%.

The indicated preparative procedure is of general applicability for the preparation of N-alkyl-N'-(p-alkyl phenyl)-p-phenylenediamines. Thus, by starting with p-cumidine, good yields of N-isopropyl-N'-(p-isopropyl phenyl)-p-phenylenediamine; M.P. 75° C., is obtained by exactly the same procedure.

The following examples of the first class, in which all parts are expressed by weight, illustrate the practice of the invention in more detail.

EXAMPLE 2

A typical natural rubber tire tread compound was prepared by mixing in a Banbury 100 parts of smoked sheets, 5 parts of zinc oxide, 3½ parts of zinc laurate, 45 parts of MPC carbon black, 3½ parts of pine tar, 1 part of mercaptobenzothiazole, and 3 parts of sulfur. One and one-half parts of the indicated protective chemicals were incorporated into the above tread compound. After curing the stocks were subjected to standard oxidation and ozone-cracking tests shown in Table I.

B. Biswell. This superiority of the N'-(p'-methyl phenyl) body over the N'-phenyl body is completely unexpected. Similar outstanding protective action is observed in GR–S and other synthetic diolefin polymer rubbers.

EXAMPLE 3

A stock was prepared by mixing 150 parts of GR–S 1600 (butadiene-styrene copolymer containing 50 parts of HAF carbon black), 2½ parts of zinc oxide, 2 parts of zinc laurate, 3 parts of a naphthenic type petroleum oil, 7 parts of saturated polymerized hydrocarbon, 2 parts of sulfur, 1½ parts of mercaptobenzothiazole, and $\frac{2}{10}$ parts of diphenylguanidine. Two parts of each of the indicated protective chemical were incorporated into the above GR–S tread compound. The cured stocks were subjected to the same outdoor dynamic ozone cracking tests described in Example 2. In addition, looped specimens were subjected to outdoor static cracking.

The extent of deterioration of the stocks containing the different protecting chemicals is tabulated below in Table II.

It will be noted that the preferred N-isopropyl-N'-(p'-methyl phenyl)-p-phenylenediamine is amazingly effective in protecting GR–S from ozone cracking. Stock containing this N'-(p'-methyl phenyl) body was in nearly perfect condition after a year of outdoor exposure under either static or dynamic conditions. Unprotected stocks, or stock protected by the commercial antiozonant, 6-ethoxy-2,2,4-trimethyl-dihydroquinoline, were badly cracked, often to the point of complete destruction. Even the powerful antiozonant, N-isopropyl - N' - phenyl-p-phenylenediamine, failed to afford the same degree of protection that the N-isopropyl-N'-(p'-methyl phenyl)-p-phenylenediamine did. This was particularly true in these samples which had been heat-aged and then exposed statically outdoors. Heat-aging approximates the effect of storing rubber articles for long periods of time (1 year or

*Table I*

| Protective Chemical | Tensile Strength | | | Cut Growth | | | Dynamic Ozone Cracking, Condition after 113 megacycles |
|---|---|---|---|---|---|---|---|
| | Unaged, p.s.i. | 96 Hrs./Oxygen Bomb | | Unaged | Heat-Aged at 212° F. | | |
| | | Numerical Value, p.s.i. | Percent Retained | | 24 Hrs. | 96 Hrs. | |
| None | 3,570 | 1,420 | 33 | 0.63 | 1.10 | 1.68 | Completely destroyed. Cracked completely through. |
| Commercial antioxidant mixture: BLE (a high-temperature reaction product of diphenylamine and acetone)+ JZF (N,N'-diphenyl)-p-phenylenediamine. | 3,470 | 2,600 | 74 | 0.33 | 0.40 | 0.88 | Practically destroyed. Cracked $\frac{9}{10}$ through. |
| N-isopropyl-N'-phenyl-p-phenylenediamine. | 3,830 | 2,840 | 71 | 0.33 | 0.33 | 0.18 | Fair condition. Cracked $\frac{1}{10}$ through. |
| N-isopropyl-N'-(p-methyl phenyl)-p-phenylenediamine. | 3,850 | 2,730 | 68 | 0.25 | 0.28 | 0.18 | Good condition. Very fine, barely visible cracks. |

It will be noted that the N-isopropyl-N'-(p'-methyl phenyl)-p-phenylenediamine is a powerful antioxidant and antiozonant. It is not only superior to the commercial superflexing antioxidant "BLE-JZF," but is also definitely superior to the powerful antiozonant, N-isopropyl-N'-phenyl-p-phenylenediamine, described in U.S. Patent No. 2,734,808, dated February 14, 1956, to Charles more). Long storage of finished rubber articles prior to use is common in commercial practice and it is highly desirable that the protective chemical maintain its efficiency throughout these long storage periods. The N-alkyl-N'-(p'-alkyl phenyl)-p-phenylenediamines are outstanding in retaining their antiozonant effectiveness during long storage.

Table II

| Protective Chemical | Static Ozone Cracking | | | Dynamic Ozone Cracking | | |
|---|---|---|---|---|---|---|
| | Unaged, After 383 days exposure | Heat-Aged at 212° F. | | Unaged. After 24 megacycles | Heat-Aged at 212° F. | |
| | | 24 Hrs., After 361 days exposure | 96 Hrs., After 43 days exposure | | 24 Hrs., After 25 megacycles | 96 Hrs., After 19 megacycles |
| None | Destroyed. Cracked completely through. | Destroyed. Cracked completely through. | Fair condition. Cracked 1/10 through. | Very bad. Cracked 1/2 through. | Very bad. Cracked 1/2 through. | Very bad. Cracked 1/2 through. |
| 6-ethoxy-2,2,4-trimethyl-di-hydro-quinoline (commercial antiozonant). | ___do___ | ___do___ | Poor condition. Cracked 2/10 through. | Poor. Cracked 2/10 through. | Fair. Cracked 1/10 through. | Good. Slightly cracked. |
| N-isopropyl-N'-phenyl-p-phenylenediamine. | Fair. Cracked 1/10 through. | Very poor. Cracked 9/10 through. | Poor. Cracked 2/10 through. | Good. Very slightly cracked. | Good. Very slightly cracked. | Excellent. Very fine cracks, barely visible. |
| N-isopropyl-N'-(p'-methyl phenyl)-p-phenylene-diamine. | Perfect. No cracks. | Perfect. No cracks. | Excellent. Very fine cracks, barely visible. | Excellent. Very fine cracks, barely visible. | Excellent. Very fine cracks, barely visible. | Do. |

As stated earlier, the ability of the N-alkyl-N'-(p-alkyl phenyl)-p-phenylenediamines to protect easily oxidizable organic materials under severe conditions is by no means limited to the diolefin polymer rubbers. Example 4, below, illustrates the powerful stabilizing action of a typical N-alkyl-N'-(p-alkyl phenyl)-p-phenylenediamine on an edible fat, tallow.

EXAMPLE 4

A modification of the standard Schaal Oven Test (King, Roschen and Irwin, Oil and Soap, 10, 107 (1933)) was employed to measure, quantitatively, the antioxidant activity of the various chemical additives. Samples of molten beef tallow containing 100 p.p.m. of the chemical additive were placed in an air oven operating at 100° C. for 7 weeks. Samples were removed at regular intervals and analyzed for peroxide content by a standard iodimetric procedure. The fresh, unaged fat has a value of less than 5 milliequivalents per 1000 grams of sample. When a peroxide value of 20 is attained, the fat is considered rancid. Pertinent results are summarized below in Table III.

Table III

| Chemical Additive | Peroxide Number After— | | | |
|---|---|---|---|---|
| | 0 Weeks | 3 Weeks | 5 Weeks | 7 Weeks |
| None | 2 to 5 | 50 | >100 | >100 |
| 2,6-ditertiary butyl-p-cresol [1] | 2 to 5 | 41 | >45 | >100 |
| N-isopropyl-N'-(p-methyl phenyl)-p-phenylene-diamine | 2 to 5 | 5.8 | 2.6 | 3.0 |
| N-isopropyl-N'-phenyl-p-phenylenediamine | 2 to 5 | 4 | 3.2 | 3.0 |

[1] Commercial fat antioxidant.

It is apparent that the N-alkyl-N'-(p-alkyl phenyl)-p-phenylenediamine is an extremely effective antioxidant for tallow.

The following examples illustrate the invention of making and using compounds of the second class.

EXAMPLE 5

N-isopropyl-N'-phenyl-p-phenylenediamine was prepared by conventional reductive alkylation of p-amine diphenylamine with acetone in the presence of platinum oxide catalyst at 155° C. and 500 p.s.i. of hydrogen.

0.7 mole of anhydrous aluminum chloride together with 2 moles of dry chlorobenzene was charged into a 1-liter, 3-neck flask equipped with motor-driven stirrer, thermometer, reflux condenser and addition funnel. 0.5 mole of the above N-isopropyl - N' - phenyl-p-phenylenediamine, M.P. 79° C.–81° C., was dissolved in 1.50 moles of dry chlorobenzene and added dropwise to the stirred aluminum chloride slurry. A solid suspension of N-isopropyl-N'-phenyl-p-phenylenediamine - aluminum chloride complex formed. The suspension was heated to 90° C. and gaseous isobutylene passed into the suspension until 1.4 moles had been absorbed. After cooling to room temperature, quenching with ice and neutralizing the liberated hydrogen chloride with alkali, the thin, brown organic layer was separated. By vacuum distilling off the chlorobenzene and recrystallizing the red crystalline residue once from methanol a 78% yield of the desired N-isopropyl-N'-(p-tertiary butyl phenyl)-p-phenylenediamine, M.P. 104° C., was obtained.

Percent nitrogen: calculated for $C_{19}H_{26}N_2$, 9.92%; found, 9.8%, 10.0%.

The above procedure is generally applicable to any N-alkyl-N'-phenyl-p-phenylenediamine and any olefin capable of forming a stable tertiary carbonium ion. In the case of the higher olefins, such as di- and triisobutylene, tetrapropylene, etc., the presence of a solvent is unnecessary. This is illustrated below.

EXAMPLE 6

9.5 moles of N-isopropyl-N'-phenyl-p-phenylenediamine was melted into a 500 cc. 3-neck flask equipped with reflux condenser, motor-driven stirrer, thermometer and dropping funnel. 0.6 mole of aluminum chloride was added slowly at about 90° C. The temperature of the slurry was then raised to 125° C. and 0.75 mole of diisobutylene was added dropwise over 3 hours time. After cooling to 40° C. and quenching with cold water the crude reaction mixture was worked up in the manner described in Example 5. A 68% yield of N-isopropyl-N'-(p-tertiary octyl phenyl)-p-phenylenediamine, M.P. 76° C.–78° C., was obtained.

Analyzed percent nitrogen: calculated for $C_{23}H_{34}N_2$, 8.29%; found, 8.21%, 8.05%.

A number of other homologues, such as N-sec.-butyl-N'-(p-tertiary dodecyl phenyl)-p-phenylenediamine and N-isopropyl-N'-(p-tertiary dodecyl phenyl)-p-phenylenediamine, were also prepared by this latter method.

The N-alkyl-N'-(p-tertiary alkyl phenyl)-p-phenylenediamines are colorless, odorless solids or liquids with excellent solubility in rubber and surprisingly good resistance to oxidation. They are much less strongly absorbed by carbon black than the related N-alkyl-N'-phenyl-p-phenylenediamines, and while retaining the outstanding antioxidant and static antiozonant ability of the latter, are appreciably less staining and discoloring. The decreased staining and discoloring properties of these N-alkyl-N'-(p-tertiary alkyl phenyl)-p-phenylenediamines as well as the excellent aging properties of rubber stocks containing them is illustrated below (parts being by weight). Example 7 illustrates the outstanding antioxidant properties of these N-alkyl-N'-(p-tertiary alkyl phenyl)-p-phenylenediamines in a Hevea tread stock.

EXAMPLE 7

A typical natural rubber tire tread compound was prepared, by mixing in a Banbury, 100 parts of smoked sheet, 5 parts of zinc oxide, 3½ parts of pine tar, 1 part of mercaptobenzothiazole and 3 parts of sulfur. One and one-half parts of protective chemicals were incorporated into aliquots of the above tread compound. After curing the stocks were subjected to standard oxidation tests.

*Table IV*

| Chemical Additive | Tensile Strength and Percent Retained | | | | | Crack Growth | |
|---|---|---|---|---|---|---|---|
| | Unaged | Aged 96 Hrs. at 212° F. | | Aged 96 Hrs./Oxygen Bomb. | | Unaged | Aged 96 Hrs. at at 212° F. |
| | | T.S., p.s.i. | Percent Ret. | T.S., p.s.i. | Percent Ret. | | |
| None | 3,570 | 1,380 | 39 | 1,420 | 40 | 0.63 | 1.10 |
| Commercial antioxidant [1] | 3,470 | 1,740 | 50 | 2,600 | 75 | 0.33 | 0.40 |
| Commercial antiozonant [2] | 3,540 | 2,090 | 59 | 1,910 | 54 | 0.38 | 0.48 |
| N-isopropyl-N'-(p'-tertiary butyl phenyl)-p-phenylenediamine | 3,630 | 2,170 | 60 | 2,800 | 77 | 0.38 | 0.38 |
| N-isopropyl-N'-(p'-tertiary octyl phenyl)-p-phenylenediamine | 3,620 | 2,000 | 55 | 2,630 | 73 | | 0.30 |
| N-isopropyl-N'-phenyl-p-phenylenediamine | 3,830 | 2,230 | 58 | 2,840 | 74 | 0.33 | 0.33 |

[1] A mixture of N,N'-diphenyl-p-phenylenediamine and the high-temperature reaction product of acetone and diphenylamine.
[2] 6-ethoxy-2,2,4-trimethyl dihyquinolindroe.

It will be observed that the N-alkyl-N'-(p-tertiary alkyl phenyl)-p-phenylenediamines are extremely efficient antioxidants. They are fully equivalent to the standard commercial antioxidant and superior to the commercial antiozonant, 6-ethoxy-2,2,4-trimethyl dihydroquinoline. They are also equivalent within the limits of experimental error to the non-ring alkylated homolog N-isopropyl-N'-phenyl-p-phenylenediamine in percent of tensile retained and cut growth. Example 8 illustrates the outstanding antiozonant properties of these phenylenediamines.

EXAMPLE 8

A typical GR–S tread compound was prepared by mixing 150 parts of GR–S 1600 (butadiene-styrene copolymer containing 50 parts of HAF carbon black), 2½ parts of zinc oxide, 2 parts of zinc laurate, 3 parts of naphthenic type petroleum oil, 7 parts of saturated polymerized hydrocarbon, 2 parts of sulfur, 1½ parts of mercaptobenzothiazole, and 2/10 part of diphenylguanidine. 2 parts of each of the indicated protective chemicals were incorporated into portions of the above stock. Looped specimens of each of the above cured stocks were subjected to outdoor static ozone cracking (as described in ASTM designation D518–44, Method B, entitled "Standard Method To Test For Resistance To Light Cracking and Cracking Of Rubber Compounds").

*Table V*

| Chemical Additive | Outdoor Static Cracking Conditions After— | |
|---|---|---|
| | 51 Days | 380 Days |
| None | Poor condition. Cracked 3/10 through. | Destroyed. Cracked completely through. |
| Commercial antioxidant [1] | Poor condition. Cracked 2/10 through. | Do. |
| 6-ethoxy-2,2,4-trimethyl-dihydroquinoline.[2] | Fair condition. Cracked 1/10 through. | Do. |
| N-isopropyl-N'-(p'-tertiary butyl phenyl)-p-phenylenediamine. | Perfect condition. No cracks. | Perfect condition. No cracks. |
| N-isopropyl-N'-(p'-tertiary octyl phenyl)-p-phenylenediamine. | ...do... | Do. |
| N-isopropyl-N'-phenyl-p-phenylenediamine. | ...do... | Good condition. Cracked 1/20 through. |

[1] Mixture of N,N'-diphenyl-p-phenylenediamine and the high-temperature reaction product of diphenylamine and acetone.
[2] Commercial antiozonant.

It will be observed that only the two N-alkyl-N'-(p-tertiary alkyl phenyl)-p-phenylenediamine type compounds protected the GR–S tread perfectly after more than a year's static outdoor exposure. Even their simpler unsubstituted relation, the N-isopropyl-N'-phenyl-p-phenylenediamine, although effective, did not afford quite the same perfect protection. The commercial antiozonant, 6-ethoxy-2,2,4-trimethyl-dihydroquinoline, was a great deal weaker than any of the phenylenediamines; in fact, the 6-ethoxy-2,2,4-trimethyl dihydroquinoline was only slightly better than the unprotected stock under the conditions of this test.

Although, as already shown, the N-alkyl-N'-(p-tertiary alkyl phenyl)-p-phenylenediamines are powerful antioxidants and antiozonants, they are markedly less staining and discoloring than either their unsubstituted homologs, the N-alkyl-N'-phenyl-p-phenylenediamines, and the other competitive antioxidants and antiozonants described above. These improved staining and discoloring characteristics are illustrated below in Example 9.

EXAMPLE 9

A natural rubber white stock was prepared, by mixing in a Banbury, 100 parts of pale crepe rubber, 10 parts of zinc oxide, 60 parts of lithopone, 60 parts of whiting, 0.5 part of zinc laurate, 3 parts of sulfur, and 0.15 part of tetramethyl thiuram monosulfide. One part of the various protective chemicals was incorporated into aliquots of this stock. After curing the different stocks were subjected to the following tests:

(a) *Cloth staining.*—One inch (1") strips of white, unsized cotton cloth are placed in close contact with a 1" x 4" rubber specimen. The assembly is mounted on white cardboard and is exposed under normal, indoor, fluorescent lighting at 70° F. for 30 days. The color and intensity of staining of the cloth strip by the rubber is graded according to the following code:

Color: B=brown; T=tan; G=gray; Y=yellow.
Intensity: 0=no color; 1 to 10=very light to very dark.

Results are summarized in column 2 of Table VI.

(b) *Lacquer staining.*—Two inches (2") of a 1" x 4" specimen is dipped in a white nitrocellulose lacquer and allowed to dry. The sample is then exposed in a window to direct sunlight for 15 days. The extent to which the white lacquer is discolored by the underlaying rubber base is described according to the code employed above in (a). Results of this test are summarized in column 3 of Table VI.

(c) *Window discoloration.*—A 1" x 4" specimen is exposed to direct sunlight in a window for 15 days. The white rubber stock is graded for discoloration according to the code described above in (a). Results of this test are summarized in column 4 of Table VI.

Table VI

| Chemical Additive | Cloth Staining | Lacquer Staining | Discoloration |
|---|---|---|---|
| None | 0 | 0 | 2Y. |
| Commercial antioxidant | 4T | 4GT | 7B. |
| 6-ethoxy-2,2,4-trimethyl dihydroquinoline. | 5BT | 2T | 6T. |
| N-isopropyl-N'-(p-tertiary butyl phenyl)-p-phenylenediamine. | 0 | 3T | 6BT. |
| N-isopropyl-N'-(p-tertiary octyl phenyl)-p-phenylenediamine. | 0 | 2T | 6BT. |
| N-isopropyl-N'-phenyl-p-phenylenediamine. | 4BT | 8B | 9B. |

It is obvious that of all the compounds listed in Table VI only the N-alkyl-N'-(p-tertiary alkyl phenyl)-p-phenylenediamine type compounds did not stain cloth. These tertiary alkyl phenyl compounds also stain lacquer and discolor white rubber stocks to a markedly lesser extent than either the commercial amine antioxidant or their unsubstituted homolog (N-isopropyl-N'-phenyl-p-phenylenediamine) and no more than the weak commercial antiozonant, 6-ethoxy-2,2,4-trimethyl-dihydroquinoline.

With the modern trend toward lighter, pastel shades in the rubber and automotive industry, staining and discoloration are becoming increasingly serious problems in the rubber chemical field, including antiozonants. It is important, however, that any decrease in staining and discoloration be accomplished without any decrease in effectiveness. The N-alkyl-N'-(p-tertiary alkyl phenyl)-p-phenylenediamines are definitely an advance over the known N-alkyl-N'-phenyl-p-phenylenediamines, in that staining and discoloration are markedly decreased without any decrease in antioxidant or antiozonant activity.

As stated earlier, the ability of the N-alkyl-N'-(p-tertiary alkyl phenyl)-p-phenylenediamines to protect easily oxidizable organic materials under severe conditions is by no means limited to the diolefin polymer rubbers. Example 10 illustrates the powerful stabilizing action of a typical N-alkyl-N'-(p-tertiary alkyl phenyl)-p-phenylenediamine on an edible fat, tallow.

EXAMPLE 10

A modification of the standard Schaal Oven Test (King, Roschen and Irwin, Oil and Soap, 10, 107 (1933)) was employed to measure, quantitatively, the antioxidant activity of the various chemical additives. Samples of molten beef tallow containing 100 p.p.m. of the chemical additive were placed in an air oven operating at 100° C. for 7 weeks. Samples were removed at weekly intervals and analyzed for peroxide content by a standard iodimetric procedure. The fresh, unaged fat has a value of less than 5 milliequivalents per 1000 gram sample. When a peroxide value of 20 is attained, the fat is considered rancid. Pertinent results are summarized below in Table VII.

Table VII

| Chemical Additive | Peroxide Number After— | | | |
|---|---|---|---|---|
| | 0 Weeks | 3 Weeks | 5 Weeks | 7 Weeks |
| None | 2 to 5 | 50 | >100 | >100 |
| 2,6-ditertiary butyl-p-cresol [1] | 2 to 5 | 41 | >45 | >100 |
| N-isopropyl-N'-(p-tertiary butyl phenyl)-p-phenylenediamine | 2 to 5 | 3.4 | 2.8 | 3.6 |
| N-isopropyl-N'-phenyl-p-phenylenediamine | 2 to 5 | 4.0 | 3.2 | 3.0 |

[1] Commercial fat antioxidant.

It is apparent that N-isopropyl-N'-(p-tertiary butyl phenyl)-p-phenylenediamine is an extremely effective antioxidant for tallow.

Having thus described my invention, what I claim and desire to protect by Letters Patent is:

1. A compound represented by the formula

where $R_1$ is a saturated aliphatic hydrocarbon radical having from 3 to 9 carbon atoms; and $R_2$ is a member from the class consisting of (a) alkyl radicals having from 1 to 12 carbon atoms and in which the alpha-carbon atom is directly attached to at least one hydrogen atom; and (b) tertiary alkyl radicals having from 4 to 12 carbon atoms in the chain.

2. A compound represented by the formula

where $R_1$ is a saturated aliphatic hydrocarbon radical having from 3 to 9 carbon atoms; and $R_2$ is an alkyl radical having from 1 to 12 carbon atoms and in which the alpha-carbon atom is directly attached to at least one hydrogen atom.

3. N - isopropyl - N' - (p' - methyl phenyl) - p - phenylenediamine.

4. N - isopropyl - N' - (p - isopropyl phenyl) - p - phenylenediamine.

5. N - (1,3 - dimethyl butyl) - N' - (p' - methyl phenyl)-p-phenylenediamine.

6. A compound represented by the formula

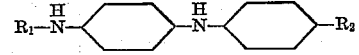

where $R_1$ is a saturated aliphatic hydrocarbon radical having from 3 to 9 carbon atoms; and $R_2$ is a tertiary alkyl radical having from 4 to 12 carbon atoms.

7. N-sec.-butyl-N'-(p-tertiary butyl phenyl)-p-phenylenediamine.

8. N-isopropyl-N'-(p-tertiary butyl phenyl)-p-phenylenediamine.

9. N-isopropyl-N'-(p-tertiary octyl phenyl)-p-phenylenediamine.

10. N-(1,3-dimethyl butyl)-N'-(p-tertiary butyl phenyl)-p-phenylenediamine.

11. A composition of matter comprising a sulfur-vulcanizable diolefin polymer rubber containing a compound as set forth in claim 2.

12. A composition of matter comprising a sulfur-vulcanizable diolefin polymer rubber containing a compound as set forth in claim 6.

13. A composition of matter comprising a vulcanized sulfur-vulcanizable diolefin polymer rubber containing a compound as set forth in claim 2.

14. A composition of matter comprising a vulcanized sulfur-vulcanizable diolefin polymer rubber containing a compound as set forth in claim 6.

References Cited in the file of this patent

UNITED STATES PATENTS

| 2,256,189 | Bogeman | Sept. 16, 1941 |
| 2,714,614 | Weinmayr | Aug. 2, 1955 |
| 2,822,395 | Dent | Feb. 4, 1958 |